United States Patent [19]
Chen

[11] Patent Number: 5,509,033
[45] Date of Patent: Apr. 16, 1996

[54] QUADRATURE OVERLAPPING MODULATION SYSTEM

[76] Inventor: Xiao H. Chen, Dept. of Electrical Engineering, University of Oulu, SF-90570 Oulu, Finland

[21] Appl. No.: 99,069

[22] Filed: Jul. 29, 1993

[51] Int. Cl.⁶ ................................................ H04L 27/36
[52] U.S. Cl. .................... 375/298; 375/261; 375/350; 364/724.12; 332/103
[58] Field of Search ..................... 375/39, 59, 60, 375/62, 67, 66, 103, 261, 295, 296, 298, 302, 303, 308, 346, 350; 370/20, 21; 307/260; 328/135, 158; 364/724.12; 332/100, 103

[56] References Cited

U.S. PATENT DOCUMENTS

| | | | |
|---|---|---|---|
| 4,613,976 | 9/1986 | Sewerison et al. | 332/103 |
| 4,644,565 | 2/1987 | Seo et al. | 375/60 |
| 4,730,344 | 3/1988 | Saha | 375/53 |

*Primary Examiner*—Stephen Chin
*Assistant Examiner*—Amanda Le
*Attorney, Agent, or Firm*—Ladas & Parry

[57] ABSTRACT

A quadrature overlapping modulation method for modulating and shaping a baseband data sequence which has a data bit rate of 1/T. The method separates a baseband data sequence into an even bit data sequence to a first channel and an odd bit data sequence to a second channel, delaying by $\tau=T$ time the even bit data sequence and the odd bit data sequence relative to each other. After that, both the even bit data sequence and the odd bit data sequence are shaped in a waveform shaping filter. A carrier signal is generated and it modulates both the even bit data sequence and the odd bit data sequence. The data sequences are shaped with a combination of a triangular function and a trigonometric function or with a convolution function of two trigonometric functions before carrier modulation.

10 Claims, 8 Drawing Sheets

ENVELOPE MIN/MAX = 0.8436

QUADRATURE OVERLAPPING MODULATION SYSTEM

FIELD OF THE INVENTION

This invention relates to digital communications systems, more particularly to Quadrature overlapping modulation systems utilizing pulse overlapping technique to shape a baseband signal before carrier modulation.

BACKGROUND OF THE INVENTION

The drive for acquiring good performance in bandwidth and power efficiency of a modulation system is continuous. As far as digital communications are concerned, digital modulation schemes are needed. The prior art in this field is as follows. Before the 1960's, at which time digital communications were only limited to laboratory testings, radio engineers considered offset QPSK (or OQPSK, Offset Quadrature Phase Shift Keying) as the most important digital modulation scheme. In 1961, minimum shift keying (MSK) modulation was introduced in U.S. Pat. No. 2,977,417 as an alternative method for OQPSK. OQPSK and MSK are also disclosed in IEEE Trans. on Communications, Vol. COM-24, No. 8 pp. 809–820, August 1976, by S. A. Gronemeyer & A. L. McBride. Both MSK and OQPSK modulation are still very widely used in many applications.

Concerning the bandwidth efficiency, neither OQPSK nor MSK can compete with multiple level phase, amplitude or their hybrid modulation schemes, such as quadrature amplitude modulation QAM, and combined amplitude-phase shift keying CAPSK. The multiple level phase, amplitude or their hybrid modulations, however, need a relatively high signal-to-noise ratio (SNR) margin to ensure an acceptable detection efficiency; otherwise they might be subject to a rapid degeneration of performance in a noisy channel. Therefore, they are not power efficient modulation schemes. Furthermore, the multiple level phase, amplitude or their hybrid modulations might not be suitable for certain applications, such as applications for non-linear channels.

On the other hand, PSK-type modulations, such as OQPSK and MSK, have a relatively high power efficiency, or robustness against channel noise; the only weakness in PSK-type modulations is their relatively low bandwidth efficiency.

If we define the PSD (power spectral density) main lobe for an OQPSK signal as the unit-normalized bandwidth unit fT in an unit of Hz/bit/sec, then the PSD main lobe for the MSK signal is 1.5 Hz/bit/sec. The most serious problem in OQPSK and MSK modulations is that their PSD side lobes decrease with the frequency at a rather slow rate, approximately at $1/f^2$ and $1/f^4$ for OQPSK and MSK, respectively. In most applications, these PSD side lobe reduction rates are not sufficient to limit the intersymbol interference (ISI) level under a certain bandwidth, as reported in ICC 1981, pp. 33.4.1–33.4.5, by T. Le-Ngoc & K. Feher. In this sense, both OQPSK and MSK modulations are not very bandwidth-efficient.

In order to increase bandwidth efficiency, quadrature-overlapped raised cosine (QORC) modulation was introduced in the 1980's, as disclosed in IEEE Trans. on Communications, Vol. COM-29, No. 3 pp. 237–249, March 1981, by M. C. Austin & M. U. Chang. OQRC modulation is different from OQPSK and MSK modulations in that it uses pulse overlapping technique to shape the baseband signal before carrier modulation. Therefore, it can use a wider pulse-shaping waveform in the time domain than the OQPSK and MSK modulations under the same data rate, in order to reduce the width of the signal spectrum in the frequency domain. The PSD side lobes for the QORC signal decrease as fast as $1/f^6$, faster than in OQPSK or MSK. This means that, under the same system bandwidth, QORC modulation will introduce a lower ISI level than OQPSK and MSK, or under the same ISI requirement, QORC modulation needs less bandwidth allocation than OQPSK and MSK modulations. This entails an improvement in bandwidth efficiency.

The disadvantages of the prior art are as follows: The power efficiency of the prior PSK-type modulations, such as OQPSK and MSK, is high, but their bandwidth efficiency is low. For the multiple level phase, amplitude or their hybrid modulations, the bandwidth efficiency is high, but the power efficiency is low. Further, when QORC modulation is considered, the bandwidth efficiency is certainly improved, but the envelope of the modulated signal is non-constant, and the signal will suffer from BER degrading (power efficiency loss) when applied to non-linear channels, such as satellite communications or terrestrial microwave relay systems which use TWTA as transmitter amplifiers.

OBJECTS AND SUMMARY OF THE INVENTION

Therefore, it is an object of the present invention to provide an improved modulation system which avoids the afore-stated disadvantages and drawbacks.

Another object of the present invention is to provide an improved modulation system which is prominent in both detection efficiency and bandwidth efficiency, which are required in most digital communications systems.

Yet another object of the present invention is to provide an improved modulation system where the power spectral densities (PSDs) of the modulated RF signal have much faster rolling-off of the side lobes than those reported. This results in enhancement in the bandwidth efficiency of the systems. Some of these, in addition, have an almost constant envelope in their modulated signals, which can effectively improve the power efficiency in non-linear channels, such as satellite communications and terrestrial microwave relay systems.

The performance of the new modulation system has been compared with reported modulation techniques, such as OQPSK, MSK and quadrature-overlapped raised cosine (QORC) modulations. The results of the comparisons show that the new modulation techniques can be used in almost any digital communications system, replacing the previous techniques to ensure more efficient use of valuable radio spectrum.

A further object of the present invention is to provide a promising modulation system for applications such as Trunk digital global satellite communication networks, Very Small Aperture Terminal (VSAT) communication networks, Terrestrial digital microwave communication links, and Digital mobile radio communication systems.

A further object of the present invention is to provide a promising modulation system for applications such as Digital radio paging, Digital high-definition television broadcasting, other digital radio services which require a strict limit for out-of-band power emission, and finally for applications such as Digital commercial broadcasting services, e.g. high-quality Digital Audio Broadcasting (DAB).

These new modulations are also suitable for different multiple access communication systems (both narrow-band and wideband systems), such as Frequency division multiple access (FDMA) systems, Time division multiple access (TDMA) systems, Code division multiple access (CDMA) systems, or other spread spectrum systems, such as frequency-hopping (FH) and time-hopping (TH) systems.

Herein we disclose new modulations with even higher bandwidth efficiency than that of QORC, yet maintaining a high power efficiency. Therefore, the superiority of the new modulations in both bandwidth efficiency and power efficiency will make them very welcomed alternatives to the prior modulations.

Various other objects, advantages and features of the invention will become readily apparent from the detailed description and the drawings, and the novel features will be particularly pointed out in the claims.

In order to achieve the above-mentioned objects, the modulation system of the present invention suggests the following four new quadrature-overlapped modulations: quadrature overlapped triangular cosine (QOTC) modulation, modified quadrature-overlapped triangular cosine (MQOTC) modulation, quadrature-overlapped cosine convolution (QOCC) modulation, and modified quadrature-overlapped cosine convolution (MQOCC) modulation. They also use the pulse overlapping technique in the pulse shaping procedure prior to the carrier modulation. Therefore, the working principle is similar to QORC modulation which uses raised cosine function as its pulse shaping waveform (PSW). The most important aspect of the new modulations is their unique PSWs employed in their modulators.

In order to realize the afore-mentioned objects, QOTC modulation uses as its pulse shaping waveform (PSW) a combination of a triangular and a cosine function, MQOTC modulation uses as its PSW the second order version of the triangular and cosine functions, QOCC modulation uses as its PSW the convolution of two identical cosine functions, and MQOCC modulation uses as its PSW the combined, more complicated version of one-order linear and cosine functions.

Therefore, as compared with QORC modulation which uses as its PSW simple raised cosine function, we can see the delicacy in the derivations of these new modulations. Specifically these widely different PSWs used in the new modulations result in much more favorable bandwidth efficiency and power efficiency. At the same time, the modulator structures for these new modulations are almost exactly the same as that for QORC modulation, except for the different pulse shaping filters, which are the key elements in determining overall system performance.

DETAILED DESCRIPTION OF THE DRAWINGS

In accordance with the invention, the four new modulations are named as

1) Quadrature-overlapped triangular cosine modulation (QOTC)
2) Modified quadrature-overlapped triangular cosine modulation (MQOTC)
3) Quadrature-overlapped cosine convolution modulation (QOCC), and
4) Modified quadrature-overlapped cosine convolution modulation (MQOCC).

The four new modulations are divided into two different groups:
1) first group: QOTC and MQOTC modulations
2) second group: QOCC and MQOCC modulations.

Figure 1:
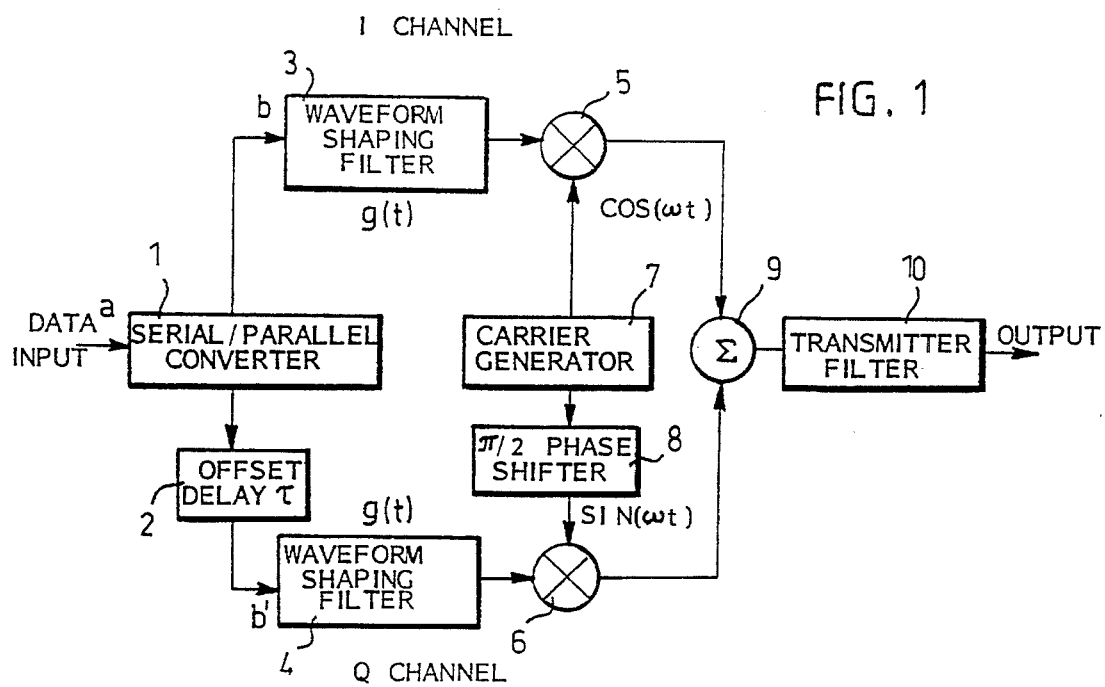
FIG. 1 shows a block diagram of a Quadrature-overlapped triangular cosine (QOTC) modulator.
Figure 2:
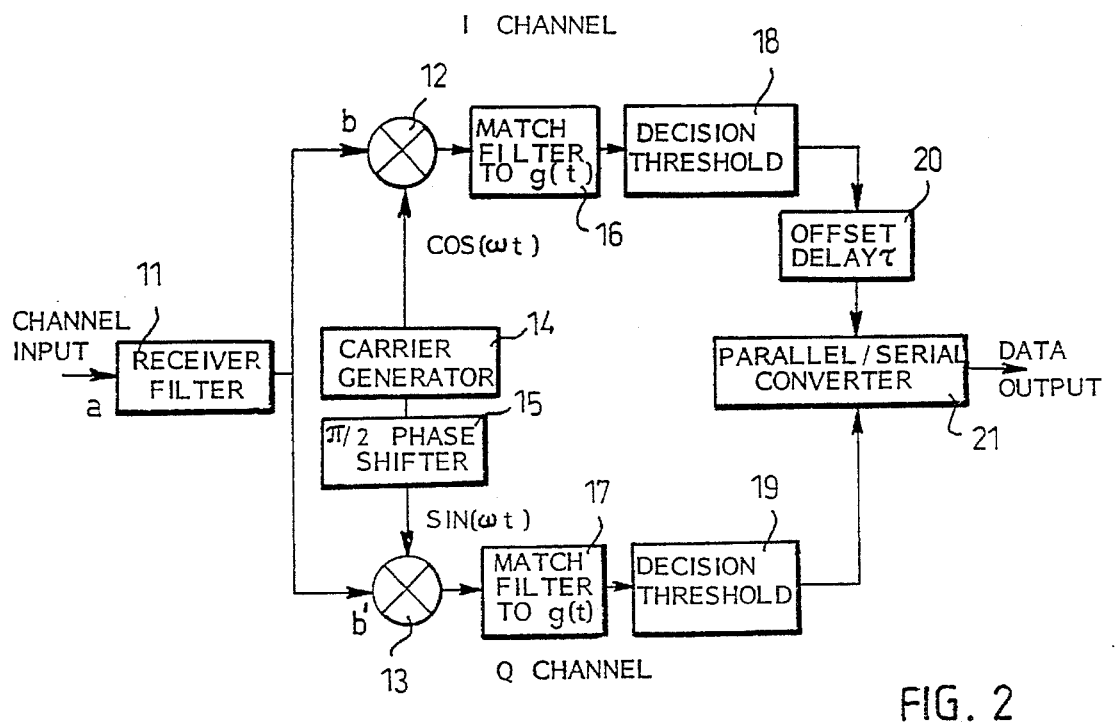
FIG. 2 shows a block diagram of the QOTC demodulator.

In considering the modulator and demodulator structure for the new modulations, FIGS. 1 and 2 illustrate the structure of staggered quadrature-overlapped modulation systems. FIG. 1 shows a modulator in a transmitter and FIG. 2 shows a demodulator in a receiver.

The modulator in FIG. 1 comprises a serial/parallel converter block 1, an offset delay block 2, Waveform Shaping Filters 3 and 4, two multiplication units 5 and 6, a carrier generator 7, a phase shifter block 8, an addition unit 9, and a transmitter filter 10. The demodulator in FIG. 2 comprises a receiver filter 11, two multiplication units 12 and 13, a carrier generator 14, a phase shifter 15, two match filters 16 and 17, two decision threshold blocks 18 and 19, a delay block 20, and a parallel/serial converter 21. The modulator and demodulator comprises two channels, I channel and Q channel.

The modulation systems of FIGS. 1 and 2 are quite normal, but according to this invention, their Waveform Shaping Filters are unique.

In this modulation method, the word "staggered" means that the data sequence in the Q channel is delayed for the time duration $\tau=T$ relative to that in the I channel. One single-shaped pulse from the "waveform shaping filter" (WSF) 3 or 4 is g(t), which is defined in the duration (0, 4T).

The original input data sequence a is first separated into even b and odd b' subsequences at the "serial/parallel converter" 1, and the b' subsequence will be delayed in the delay block 2 for the time duration $\tau=T$ because of the staggering requirement. It is assumed that the data bit rate in the original input a is 1/T. Therefore, the bit duration in either I or Q channel will be 2T. The output of one single pulse g(t) from the WSF has a duration 4T. The sign of g(t) depends on the sign of the corresponding input data bit to WSF. The overlapping pulses are fed into quadrature carrier modulator or multiplication units 5 an 6 for the carrier modulation. After the carrier modulation and later on, the signal is fed to the bandpass filtering in block 10 to limit out-of-band power emission. An inverse process exists in the demodulator unit as shown in FIG. 2 in blocks 11–21.

In FIGS. 1 and 2, the most important part is the Waveform Shaping Filter (WSF) 3 and 4, the transfer function of which is $H_{WSF}(w)$, because $H_{WSF}(w)$ uniquely determines the Power Spectral Density (PSD) of the modulated signal. The superiority of the new modulation techniques is also based on its special WSF design, which can generate particularly shaped waveforms g(t) in FIG. 1 and 2, which in turn make the modulated signals efficient in the bandwidth.

The normalized PSW for the QOTC modulation is given as follows:

$$g(t) = \begin{cases} \frac{t}{2T} - \frac{1}{2\pi} \sin\frac{\pi t}{T} & (0 \leq t \leq 2T) \\ \left(2 - \frac{t}{2T}\right) + \frac{1}{2\pi} \sin\frac{\pi t}{T} & (2T \leq t \leq 4T) \end{cases} \quad (1)$$

where we can see that it consists of two components, a triangular function $$g_1(t) = \begin{cases} \frac{t}{2T} & (0 \leq t \leq 2T) \\ 2 - \frac{t}{2T} & (2T \leq t \leq 4T) \end{cases} \quad (2)$$

and a cosine function $$g_2(t) = \begin{cases} -\frac{1}{2\pi} \sin\left(\frac{\pi t}{T}\right) & (0 \leq t \leq 2T) \\ \frac{1}{2\pi} \sin\left(\frac{\pi t}{T}\right) & (2T \leq t \leq 4T) \end{cases} \quad (3)$$

Thus $$g(t) = g_1(t) + g_2(t) \quad (4)$$

Figure 3:
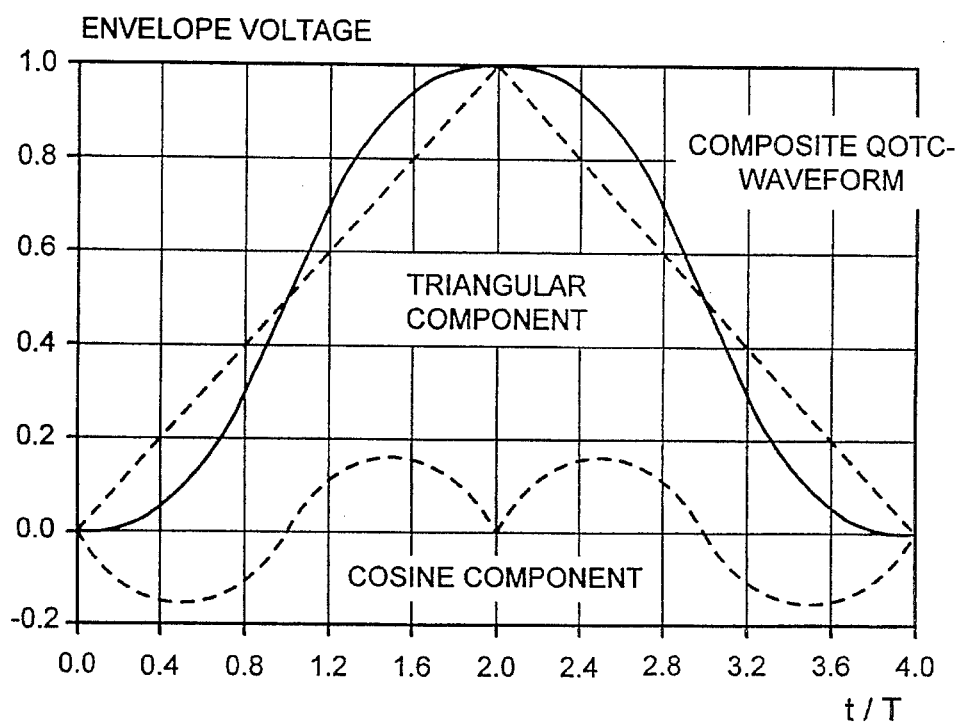
FIG. 3 shows a time domain PSW for QOTC modulation.

The PSW (Pulse shaping waveform) for QOTC modulation is shown in FIG. 3, from which we can see how the PSW comprises two components, a triangular component and a cosine component, which is the trigonometric component.

QOTC modulation relates to the Quadrature overlapping modulation method for modulating and shaping a baseband data sequence, said data sequence having a data bit rate of 1/T, comprising separating said baseband data sequence into an even bit data sequence to a first channel (I Channel) and an odd bit data sequence to a second channel (Q Channel), delaying τ=T time said even bit data sequence and said odd bit data sequence relative to each other, shaping both said even bit data sequence and said odd bit data sequence in a waveform shaping filter, generating a carrier signal, and modulating both said even bit data sequence and said odd bit data sequence with said carrier signal. According to the principle of QOTC, in this method said data sequences are shaped with a combination of a triangular function and a trigonometric function before carrier modulation. The pulse shaping according to the QOTC principle can also be presented as a convolution between the square pulse and the raised cosine signal.

MQOTC modulation relates to the Quadrature overlapping modulation method for modulating and shaping a baseband data sequence, in which method said data sequences are shaped with a second order version of said combination of a triangular function and a trigonometric function before carrier modulation. The pulse shaping according to the MQOTC principle can also be presented as a convolution between the square pulse and the QOTC PSW signal.

The normalized PSW for MQOTC modulation is given as follows:

$$g(t) = \quad (5)$$

Figure 4:
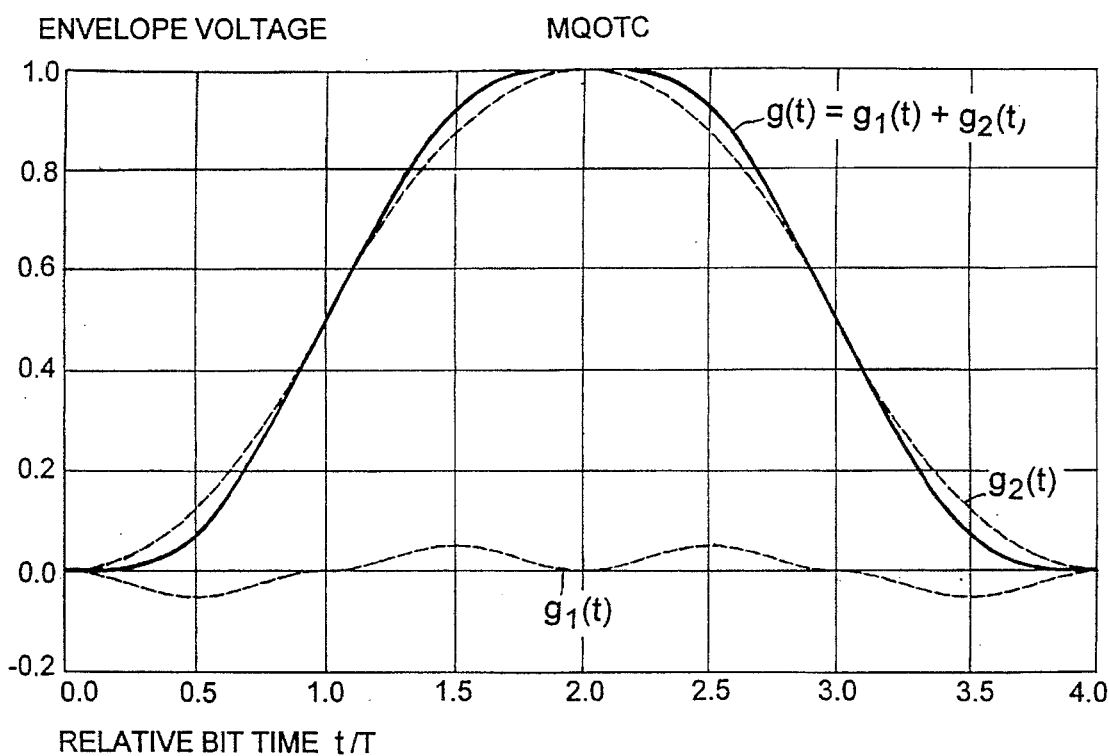
FIG. 4 shows a time domain PSW for MQOTC modulation.

-continued $$\begin{cases} \frac{t^2}{2T^2} - \frac{1}{2\pi^2} \sin^2\left(\frac{\pi t}{T}\right) & (0 \leq t \leq T) \\ \frac{2t}{T} - \frac{t^2}{2T^2} - 1 + \frac{1}{2\pi^2} \sin^2\left(\frac{\pi t}{T}\right) & (T \leq t \leq 3T) \\ -\frac{4T}{T} + \frac{t^2}{2T^2} + 8 - \frac{1}{2\pi^2} \sin^2\left(\frac{\pi t}{T}\right) & (3T \leq t \leq 4T) \end{cases}$$

where we can see that the second order (raised to the power of two) factors of rational and cosine terms are used to form the PSW for the MQOTC modulation. Actually, equation (5) is a modified version of (1). Therefore, we call it the modified QOTC (MQOTC) modulation. The PSW (Pulse shaping waveform) for the MQOTC modulation is shown in FIG. 4.

QOTC and MQOTC modulations have some points in common. Both of them have a sample level g(T)=g(3T)=0.5, which indicates that the overlapping waveforms in both I and Q channels will have no "ripples". The shapes for the PSWs of both modulations are "fat", or the time width between g(T) and g(3T) is 2T, which is advantageous in view of improving robustness against an inaccurate sampling position which is due to timing jitter at the receiver.

QOCC modulation relates to the Quadrature overlapping modulation method for modulating and shaping a baseband data sequence, said data sequence having a data bit rate of 1/T, comprising separating said baseband data sequence into an even bit data sequence to a first channel (I Channel) and an odd bit data sequence to a second channel (Q Channel), delaying τ=T time said even bit data sequence and said odd bit data sequence relative to each other, shaping both said even bit data sequence and said odd bit data sequence in a waveform shaping filter, generating a carrier signal, and modulating both said even bit data sequence and said odd bit data sequence with said carrier signal. According to the principle of QOCC, in this method said data sequences are shaped with a convolution function of two trigonometric functions.

Figure 5:
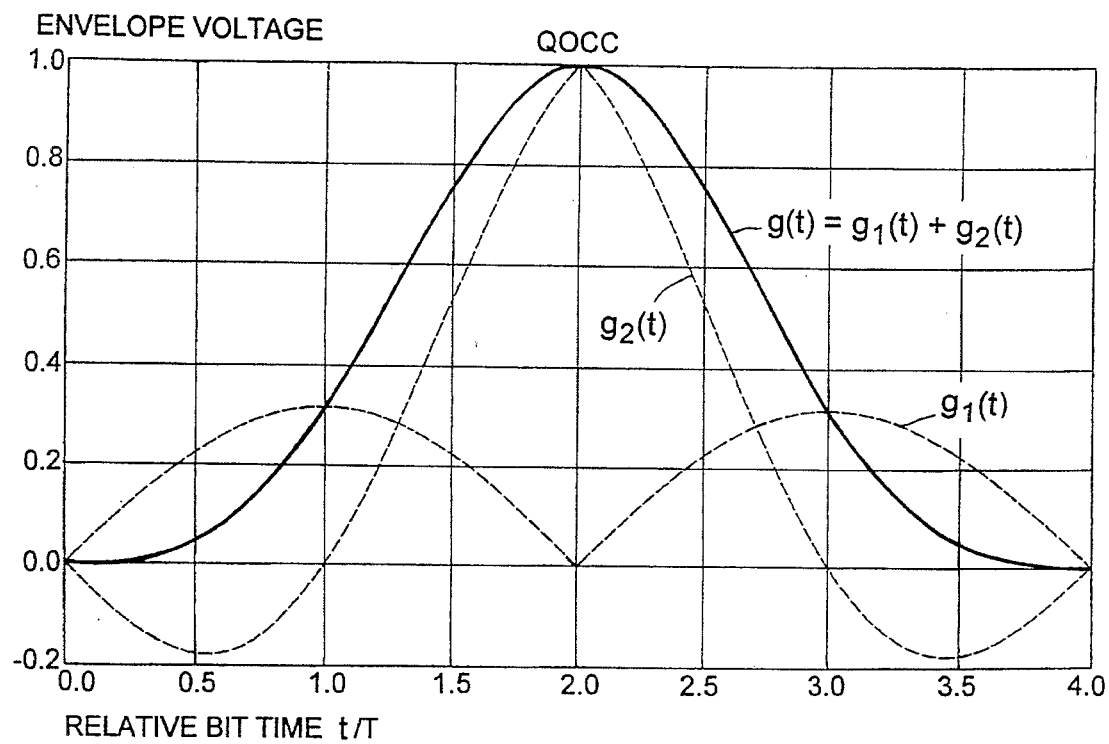
FIG. 5 shows a time domain PSW for QOCC modulation.

The PSW for the QOCC modulation is given as follows:

$$g(t) = \begin{cases} \frac{1}{\pi} \sin\frac{\pi t}{2T} - \frac{t}{2T} \cos\frac{\pi t}{2T} & (0 \leq t \leq 2T) \\ \left(\frac{t}{2T} - 2\right) \cos\frac{\pi t}{2T} - \frac{1}{\pi} \sin\frac{\pi t}{2T} & (2T \leq t \leq 4T) \end{cases} \quad (6)$$

which is derived by convolution of two identical cosine functions. This is the reason why the name of QOCC modulation is used. The PSW of OQCC is shown in FIG. 5.

MQOCC modulation relates to the Quadrature overlapping modulation method for modulating and shaping a baseband data sequence, in which method said data sequences are shaped with a combination of a one-order linear function and a trigonometric function. The pulse shaping according to the MQOCC principle can also be presented as a convolution between the trigonometric function and the QOTC function.

The PSW for MQOCC has a more complicated form and is given as follows, g(t)=

$$\frac{T\sin\frac{2\pi t}{T}}{15\pi^2} - \frac{64T\sin\frac{\pi t}{2T}}{15\pi^2} + \frac{2t}{\pi} - (0 \leq t \leq T) \quad (7)$$

$$\frac{T\sin\frac{2\pi t}{T}}{15\pi^2} - \frac{128T\cos\frac{\pi t}{2T}}{15\pi^2} - \frac{64T\sin\frac{\pi t}{2T}}{15\pi^2} +$$

$$\frac{2(2T-t)}{\pi} \quad (T \leq t \leq 2T)$$

-continued $$\frac{T\sin\frac{2\pi t}{T}}{15\pi^2} - \frac{\sqrt{2}\,T\cos\left(\pi\left(-\frac{t}{2T}+\frac{1}{4}\right)\right)}{6\pi^2} -$$

$$\frac{251T\cos\frac{\pi t}{2T}}{30\pi^2} + \frac{41T\sin\frac{\pi t}{2T}}{10\pi^2} - \frac{2(2T-t)}{\pi} - (2T \leq t \leq 3T)$$

$$\frac{T\sin\frac{2\pi t}{T}}{15\pi^2} + \frac{64T\sin\frac{\pi t}{2T}}{15\pi^2} + \frac{2(4T-t)}{\pi} \quad (3T \leq t\,4T)$$

Figure 6:
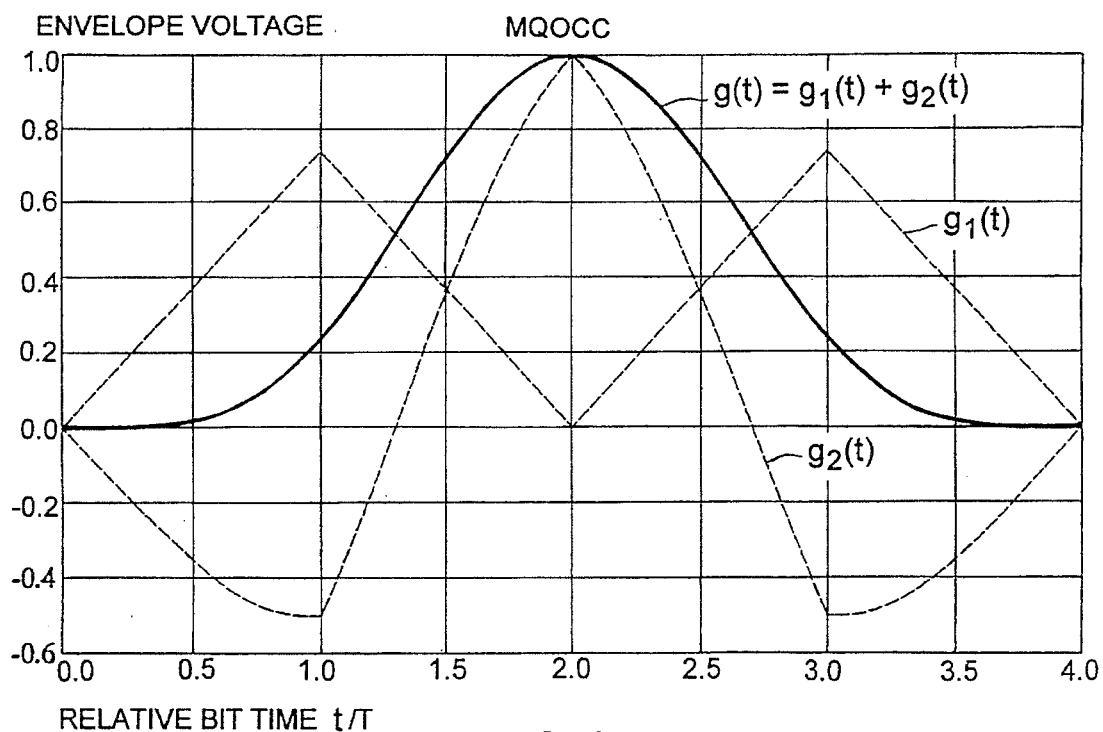
FIG. 6 shows a time domain PSW for MQOCC modulation.
Figure 7A:
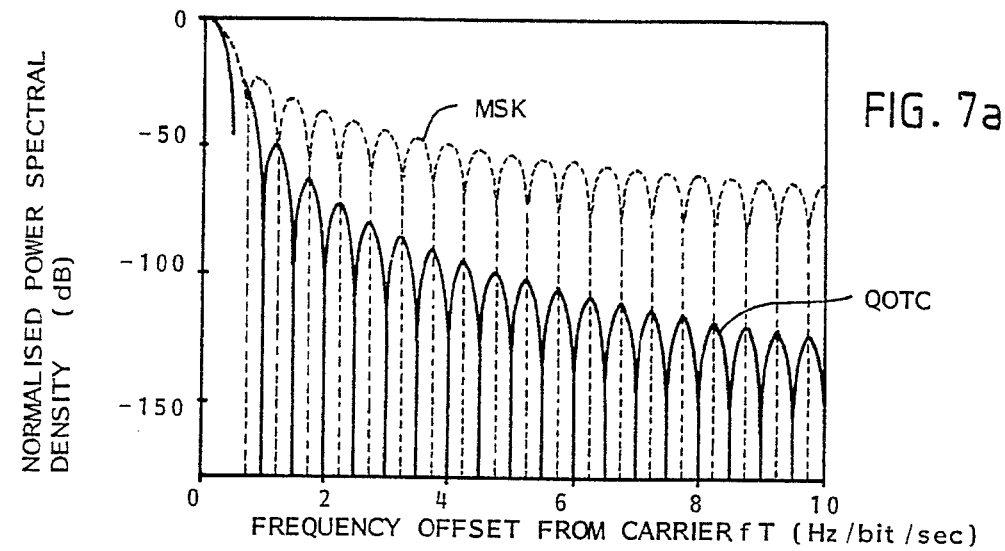
FIG. 7a shows PSDs for QOTC compared with PSD for MSK.
Figure 7B:
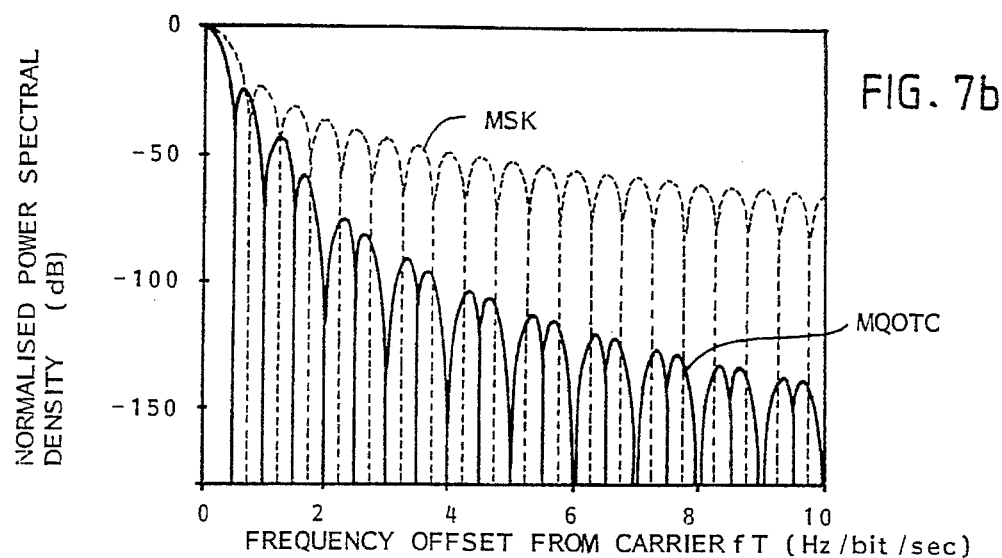
FIG. 7b shows PSDs for MQOTC compared with PSD for MSK.
Figure 7C:
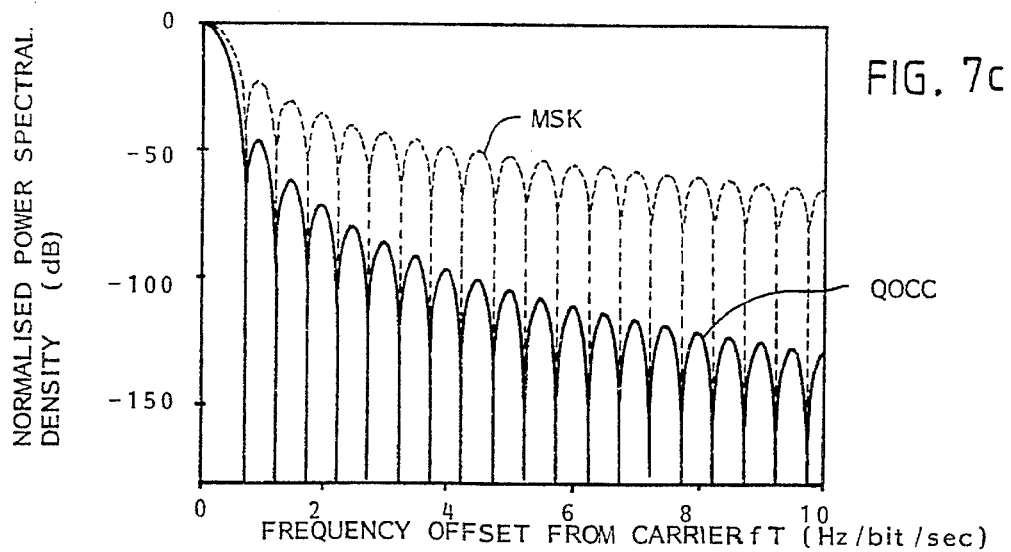
FIG. 7c shows PSDs for QOCC compared with PSD for MSK.
Figure 7D:
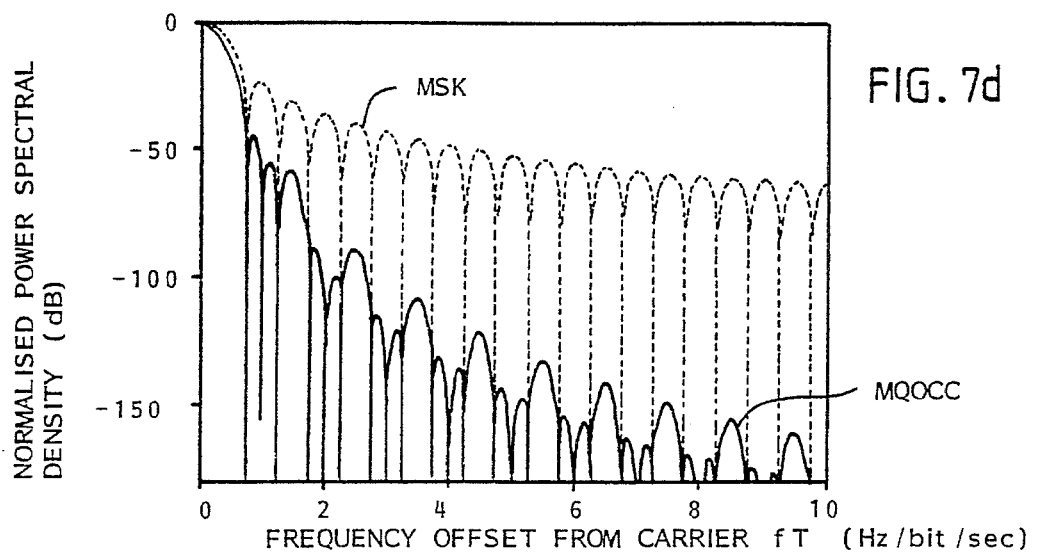
FIG. 7d shows PSDs for MQOCC compared with PSD for the MSK.

The above equation is not normalized. In order to normalize (7), the normalizing factor $128T/15\,\pi^2$ should be used. The normalized PSW of MOQCC is shown in FIG. 6. The obvious difference between the first group and the second group of modulations is the shape of their PSWs. The shape for the PSW of QOCC modulations is "slimmer" than the one of QOTC modulation. These "slimmer" PSWs are useful in improving BER degrading in non-linear channels.

From FIG. 1 we can see that, in order to obtain the required PSWs g(t) at the output end of the WSFs, the WSFs must have the correct frequency transfer functions (FTFs) to generate the corresponding PSWs for different modulations. Considering that the input signal to the WSFs is always square pulses with the duration 2T, we can derive the frequency transfer functions for all these four new modulations as follows:

For QOTC modulation, we have the following FTF:

$$H_{WSF}(\omega) = \left(\frac{\sin\omega T}{\omega T}\right)\left(\frac{e^{-j\omega t}}{1-\frac{\omega T}{\pi}}\right) \quad (8)$$

For MQOTC modulation, the following FTF is obtained:

$$H_{WSF}(\omega) = \left(\frac{\sin\frac{\omega T}{2}}{\frac{\omega T}{2}}\right)^2\left(\frac{e^{-j\omega T}}{1-\left(\frac{\omega T}{2\pi}\right)^2}\right) \quad (9)$$

For QOCC modulation, the FTF is $$H_{WSF}(\omega) = \frac{8}{\pi^2}\frac{\cos^2\omega T}{\left(\frac{\sin\omega T}{\omega T}\right)}\left(\frac{e^{-j\omega T}}{1-\left(\frac{2\omega T}{\pi}\right)^2}\right) \quad (10)$$

For MQOCC modulation, the FTF is $$H_{WSF}(\omega) = \frac{15\pi^2}{64}\frac{\sin\left(\frac{\omega T}{2}\right)}{\frac{\omega T}{2}}\frac{\cos(\omega T)}{\cos\left(\frac{\omega T}{2}\right)}\frac{e^{-j\omega T}}{\left(1-\left(\frac{\omega T}{2\pi}\right)^2\right)\left(1-\left(\frac{2\omega T}{\pi}\right)^2\right)} \quad (11)$$

The FTFs given above are very important, since in accordance with them we can easily synthesize the corresponding filters (WSFs) for different modulations by using various digital filter designing techniques, such as FIR and IIR digital filters, in the frequency domain. Furthermore, by modern micro-electronic techniques all these new modulator units can be made into a customized IC chip which includes all these quadrature overlapping waveforms in the time domain with a control signal input by means of which the user can easily shift from one modulation scheme to another, when necessary.

Figure 13:
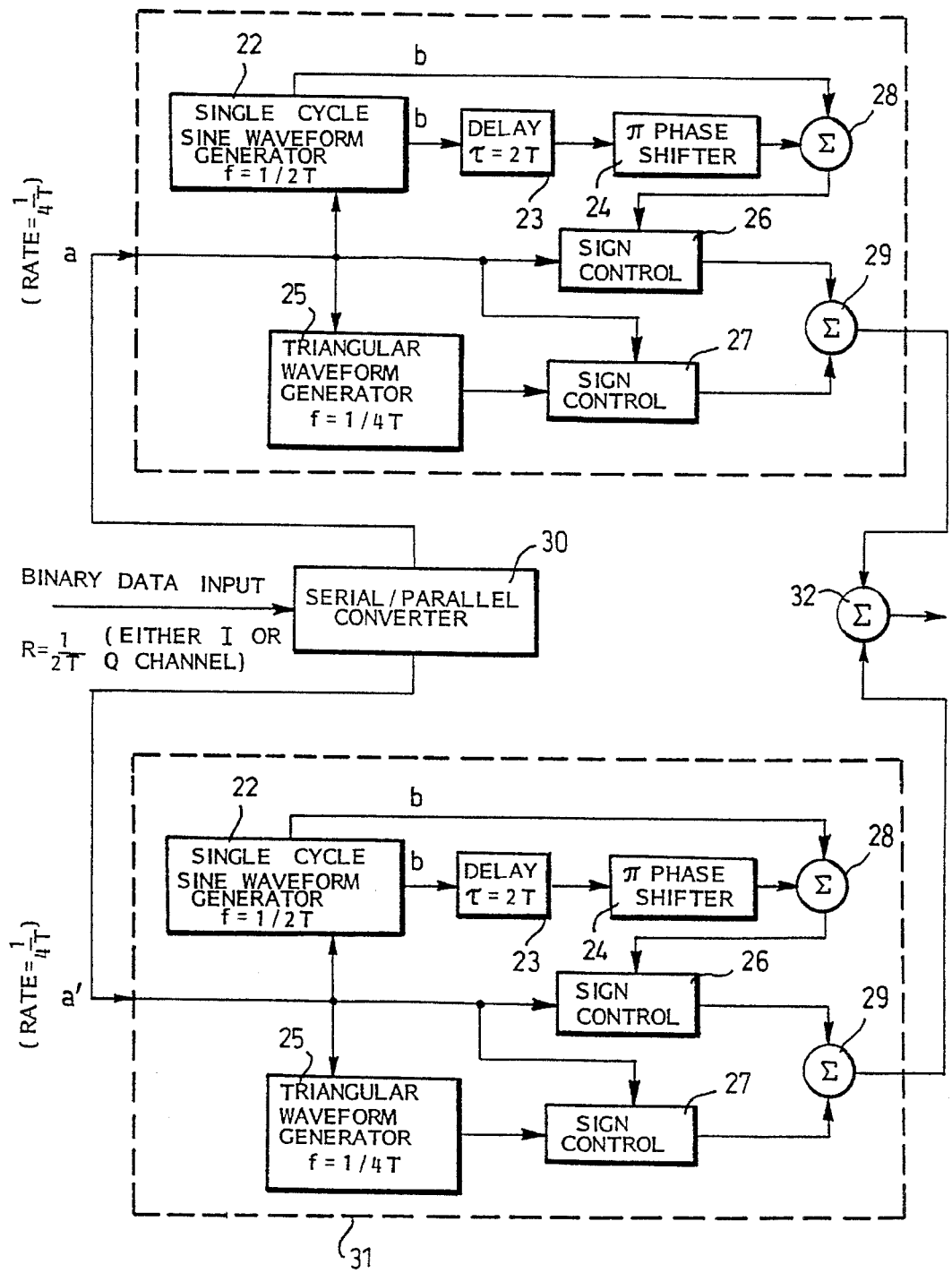
FIG. 13 shows a block diagram of a QOTC pulse shaping generator.

In particular, for QOTC modulation we give a QOTC pulse shaping waveform generator block diagram as shown in FIG. 13. The figure thus presents the structure of the Waveform Shaping Filter, which comprises a single cycle sine waveform generator 22, a delay block 23, a π phase shifter 24, a triangular waveform generator 25, two sign control blocks 26 and 27, and two adder units 28 and 29.

In the block diagram of FIG. 13, there are two exactly identical units. In each of them, the fundamental parts are a "single cycle sine waveform generator" 22 which produces the sine pulses with a frequency of f=½T, and a "triangular waveform generator" 25 yielding triangular pulses with a frequency of f=¼T (2T is the binary bit duration in either I or Q channel). When a single sine waveform is generated at b, it will take two different paths. One is directly into an adder unit 28. The other first delays 2T in the delay block 23, then goes through a "π phase shifter" 24 and is added together with the first one in the adder unit 28, forming two back-to-back cosine waveforms.

The triangular waveform is generated in block 25. The binary data input sequence with the rate ½T from either I or Q channel is first split by "serial/parallel converter" 30 into two subsequences a and a', both of which have the duration 4T. Subsequence a controls the signs of the generated sine and triangular waveforms in the sign control blocks 26 and 27. It is also responsible for triggering blocks 22 and 25 for synchronization purposes.

The outputs from the two units (the upper one including blocks 22 to 29 and the lower one 31) are added together by an adder unit 32 to form the final QOTC-shaped pulse sequence which carries the input data information. It is to be noted that the outputs from the upper and lower units have the duration 4T, but are staggered with each other by 2T. In this way, the required overlapping waveform is produced.

The Power Spectral Density, PSD, functions for the four new modulations are derived as follows. For the QOTC-modulated signal:

$$PSD(\omega) = \left(\frac{\sin\omega T}{\omega T}\right)^4\frac{1}{\left(1-\left(\frac{\omega T}{\pi}\right)^2\right)^2} \quad (12)$$

For the MQOTC-modulated signal:

$$PSD(\omega) = \left(\frac{\sin\omega T}{\omega T}\right)^2\left(\frac{\sin\frac{\omega T}{2}}{\frac{\omega T}{2}}\right)^4\frac{1}{\left(1-\left(\frac{\omega T}{2\pi}\right)^2\right)^2} \quad (13)$$

For the QOCC-modulated signal:

$$PSD(\omega) = \frac{\cos^4\omega T}{\left(1-\left(\frac{2\omega T}{\pi}\right)^2\right)^4} \quad (14)$$

For the MQOCC-modulated signal:

$$PSD(\omega) = \quad (15)$$

-continued $$\left(\frac{\sin\frac{\omega T}{2}}{\frac{\omega T}{2}}\right)^4 \frac{\cos^2\omega T}{\left(1-\left(\frac{2\omega T}{\pi}\right)^2\right)^2 \left(1-\left(\frac{\omega T}{2\pi}\right)^2\right)^2} \quad 5$$

In all above PSD equations, ω is the angular frequency offset from carrier. According to these derived PSD expressions, the PSDs for the four new modulations are plotted in FIGS. 7(a) to 7(d), where the PSDs of the four new modulations are compared with that of MSK.

In the above-mentioned PSD plots, the normalized frequency offset from carrier fT is used with the unit Hz/bit/sec. From these figures (FIG. 7(a) to 7(d)), we can see that all of the new modulations can provide much faster rolling-off of their PSD side lobes than MSK modulation.

Figure 8:
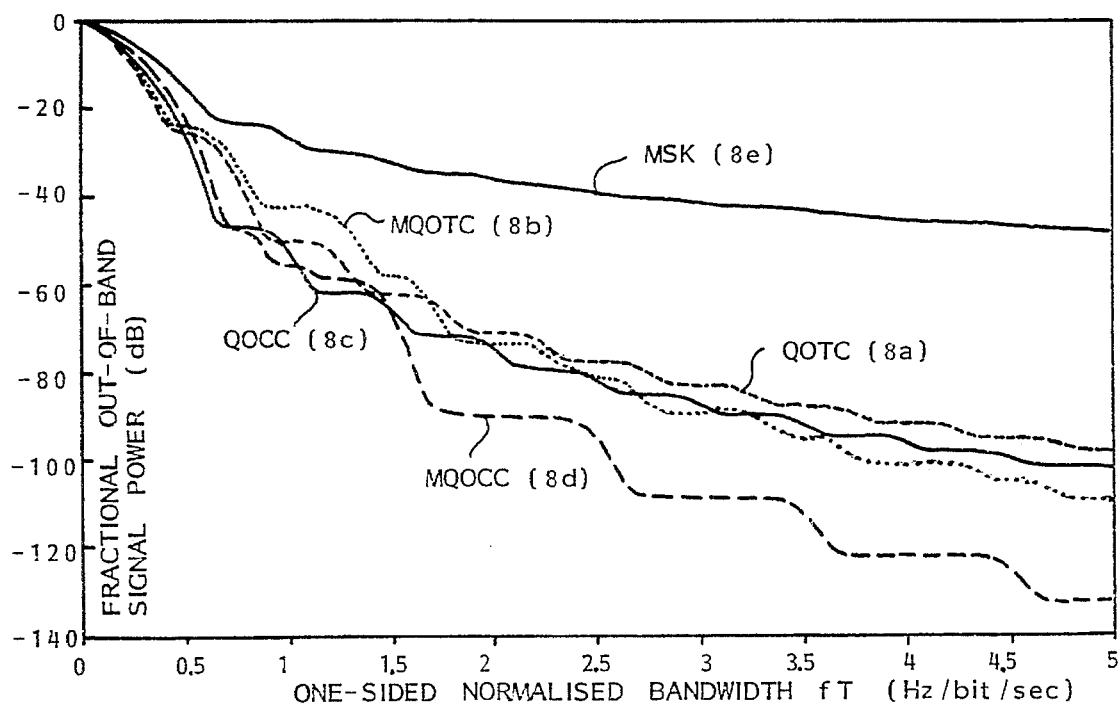
FIG. 8 shows out-of-band power (OOBP) for the QOTC, MQOTC, QOCC, and MQOCC compared with OOBP for MSK.

Referring to FIG. 8, we now use another bandwidth efficiency parameter, the out-of-band power (OOBP), to compare the new modulations with MSK modulation. The out-of-band power level is defined as $$P_{OUT}(B) = 10 \log \left[ 1 - \frac{\int_{-B}^{B} PSD(\omega) d\omega}{\int_{-\infty}^{\infty} PSD(\omega) d\omega} \right] \text{(dB)} \quad (16)$$

where PSD(ω) is the PSD of the modulated signal and B is the one-sided bandwidth of the system. The physical meaning of (16) is the amount of power left outside a specific bandwidth B. Obviously, the more power is left outside the band, the smaller the portion of signal power that can be transmitted to the receiver, or the more serious distortion will be introduced in the demodulated signal.

The new modulations given here are promising alternative digital modulation schemes, because they leave less power outside the assigned band than all the other modulations shown here, as we can clearly see from the out-of-band power levels shown in FIG. 8.

In FIG. 8, curve 8a represents OOBP for QOTC modulation curve 8b represents OOBP for MQOTC modulation, curve 8c represents OOBP for QOCC modulation, and curve 8d represents OOBP for MQOCC modulation. Curves 8a–8d should be compared with curve 8e representing the OOBP for MSK modulation.

In order to numerically compare the bandwidth efficiencies, the one sided bandwidth requirement for different normalized PSD levels is shown in Table 1 for different modulation schemes.

TABLE 1

The one-sided bandwidth requirements for different modulations

| NORMALIZED PSD LEVEL (dB) | NORMALIZED ONE-SIDED BANDWIDTH (fT) | | | | | | |
|---|---|---|---|---|---|---|---|
| | PSK | MSK | QORC | QOTC | MQOTC | QOCC | MQOCC |
| −3 | 0.2211 | 0.2968 | 0.1798 | 0.1904 | 0.1933 | 0.2124 | 0.2365 |
| −10 | 0.369 | 0.5097 | 0.314 | 0.3301 | 0.3341 | 0.3768 | 0.4192 |
| −20 | 1.3406 | 0.6517 | 0.4124 | 0.4274 | 0.4305 | 0.5097 | 0.5648 |
| −30 | 4.7987 | 1.1419 | 0.4631 | 0.7664 | 0.7901 | 0.5948 | 0.6538 |
| −40 | 15.7714 | 2.51 | 0.6989 | 0.8623 | 0.8785 | 0.6517 | 0.7064 |
| −50 | 49.283 | 4.4887 | 1.065 | 1.2426 | 1.4024 | 0.8517 | 0.9245 |
| −60 | 158.739 | 7.5661 | 1.6609 | 1.3763 | 1.712 | 1.1419 | 1.5055 |
| −70 | 503.252 | 14.018 | 2.4137 | 1.8653 | 1.8168 | 1.6200 | 1.6308 |
| −80 | 1591.25 | 25.001 | 3.6449 | 2.7927 | 2.4246 | 2.5100 | 1.693 |
| −90 | 5032.75 | 44.031 | 5.3857 | 3.7673 | 2.8084 | 3.0876 | 2.4943 |
| −100 | 15915.8 | 78.991 | 7.8884 | 4.816 | 3.7687 | 4.0903 | 2.6503 |

All data in the above table are obtained for g(t) defined in the duration 4T, and the unit of fT is Hz/bit/sec. One-sided bandwidth means that only the side of the frequency offset from carrier is considered. If the other side of the frequency offset from carrier is taken into account, then all data in the above table should simply be doubled.

The next factor to be analyzed for different modulations is the ISI level, which is a result of the limited bandwidth. In a digital communications system, there are two main sources of interference responsible for system performance degrading. One is the additive white Gaussian noise (AWGN) in the channel. The other is the intersymbol interference (ISI) caused by the modulated signaling itself on account of the finite transmission bandwidth. Both of these are related to the bandwidth efficiency performance of the modulation scheme. Certainly, the narrower the filter bandwidth or the wider the transmitted signal spectrum for a certain data rate, the more serious the ISI will be. Therefore, it is advantageous to use a modulated signal which occupies less bandwidth, to reduce the ISI level. In this sense, the new modulated signals introduced will undoubtedly surpass all previously reported PSK-type modulations in ISI performance.

The peak absolute ISI level is used here to compare the ISI performance of various modulations. In order to use dB values to measure the "peak absolute ISI level", all side lobes are calculated in their absolute values. The peak absolute ISI level for different modulations is shown in the following figures.

Figure 9:
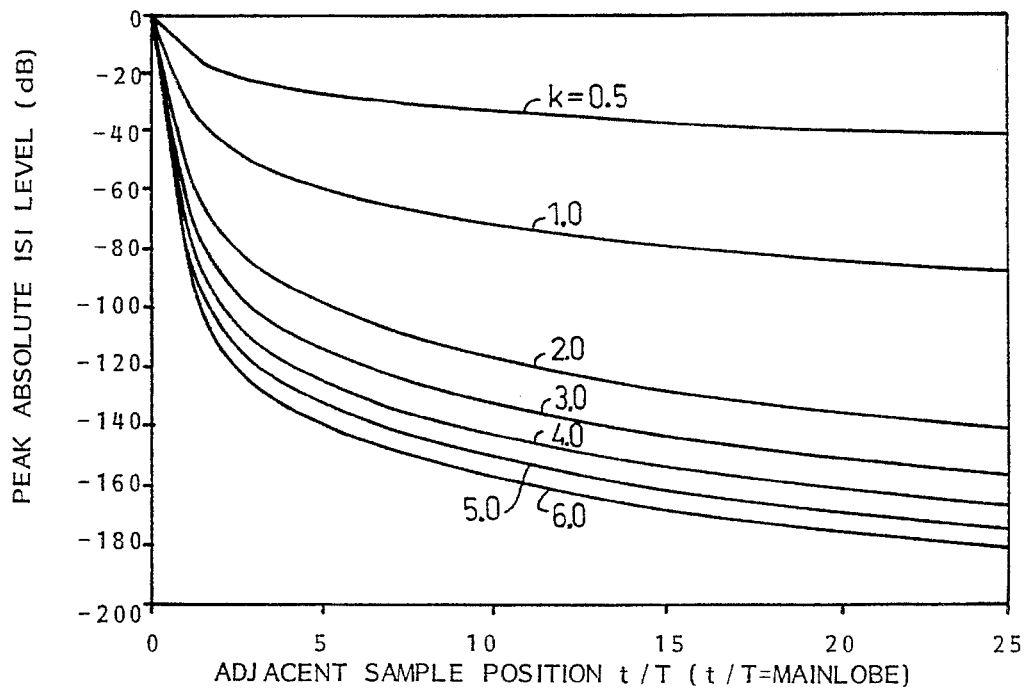
FIG. 9 shows the Peak absolute ISI level of QOTC modulation.

FIG. 9 presents the peak absolute ISI level of QOTC modulation. In FIG. 9, the ISI levels at 25 sample positions adjacent to the main lobe are presented. When the system bandwidth is greater Than k=fT=2, the new modulations obviously give a much lower ISI, which means that a lower BER performance (if we assume that BER is caused by ISI only) is to be expected with the same system bandwidth than for the previous PSK-type modulations.

Figure 12:
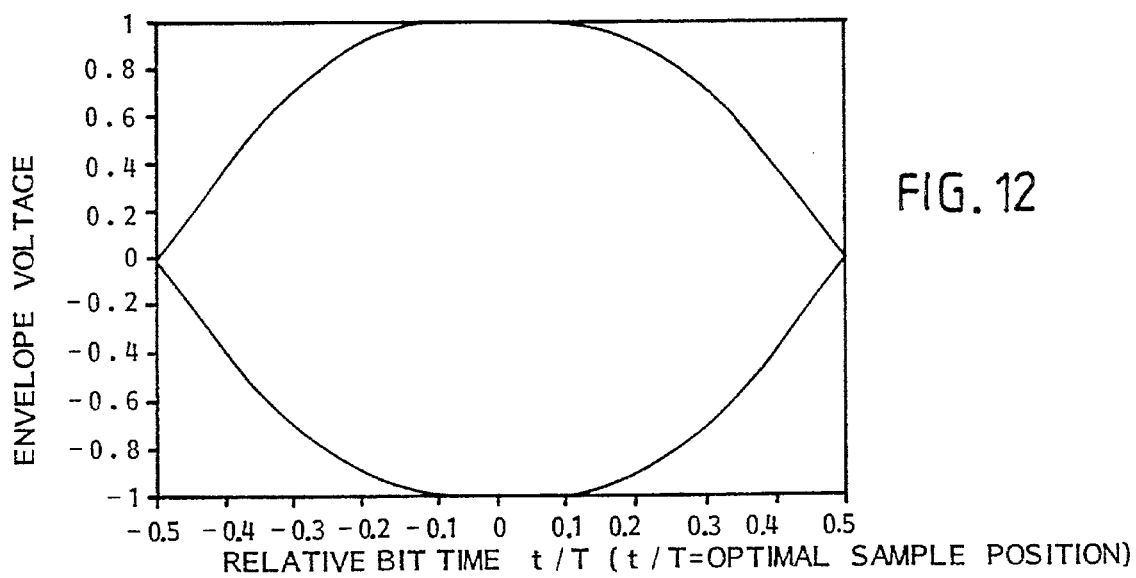
FIG. 12 shows the Eye pattern for QOTC modulation.

The eye pattern for the new modulation QOTC is given in FIG. 12. It can be seen that the eye pattern for QOTC has wider horizontal openings than that of QORC modulation normally has. This means that QOTC modulation can better endure sample timing jitter at the receiver. Thus, performance degeneration due to imperfect synchronization will be less. Therefore, both QOTC and MQOTC modulations are particularly suitable for applications in a hostile radio environment that is relatively harsh for accurate synchronization, such as mobile communications in urban areas, military communication systems, and satellite communications. On the other hand, the horizontal eye openings for QOCC and MQOCC modulations are not as wide as those for QOTC and MQOTC modulations. Yet they have another very unique feature originating from their particular PSWs which will be very helpful in improving the BER performance in non-linear channels, such as satellite communications and microwave relay systems.

Figure 11:
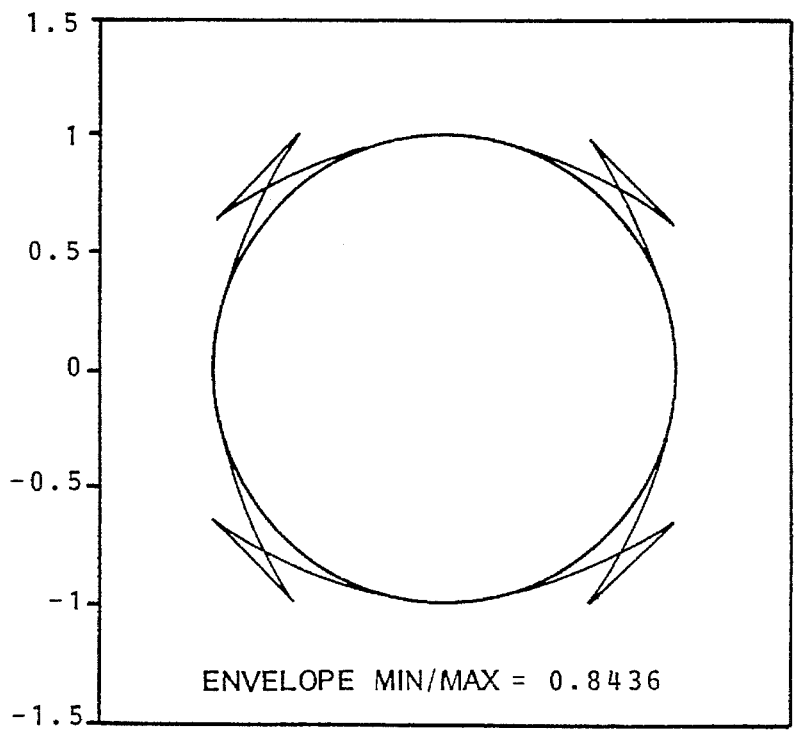
FIG. 11 shows a signal vector diagram for QOCC modulation.

The signal vector diagram for the new QOCC-modulated signal is shown in FIG. 11. The signal vector diagram of the modulated signal can display how the envelope of the modulated signal will change with the phase of the modulated signal. If the modulated signal has a constant envelope, the signal vector diagram should be a perfect circle. Otherwise, some other diagram shape will appear. In some applications, a constant envelope is very much required. For instance, if applied to non-linear communication channels such as satellite systems where a travelling wave tube amplifier (TWTA) is used as a transmitter power amplifier, the envelope of the transmitting signal to the channel should be as constant as possible in order to reduce the effect of the non-linearity of the channel. A certain parameter, the ratio ρ of the minimum envelope amplitude to the maximum envelope amplitude, can be introduced to measure how seriously the envelope fluctuates with time. The more severely the envelope fluctuates with time the smaller ρ will be.

We also give the other characteristic parameters of the PSWs as follows. One is the average power μ of the PSWs, which is defined as $$\mu = \frac{1}{4T} \int_0^{4T} g^2(t)dt \quad (25)$$

where g(t) (g(t)≦1, 0≦t≦4T) is the normalized pulse-shaping waveform. Another parameter is the normalized sample value g(T). These three parameters ρ, μ and g(T) are very important in determining the power efficiency of the modulations in the non-linear channels, as will be shown hereinbelow. These three parameters for different modulations are listed in Table 2.

TABLE 2

Three characteristic parameters for different signalings

| Modulation type | Envelope ratio min/max ρ | Average pulse power μ | Normalized sample value g(T) (g(t) ≠ 0, 0 ≦ t ≦ 4T) |
| --- | --- | --- | --- |
| QORC | 0.7071 | 0.375 | 0.5 |
| QOTC | 0.7071 | 0.396659 | 0.5 |
| MQOTC | 0.7071 | 0.402472 | 0.5 |
| QOCC | 0.8436 | 0.293318 | 0.318309 |
| MQOCC | 0.9041 | 0.269333 | 0.23631 |

From Table 2 we can see that, basically, the four new modulations can be divided into two groups, the first group including QOTC and MQOTC modulations and the second group QOCC and MQOCC modulations. QOTC and MQOTC modulations have very similar characteristic parameters, with small ρ and large μ and g(T) values. On the other hand, the second group, QOCC and MQOCC modulations, displays quite different parameters. They have a much higher level of ρ and smaller μ and g(T) than the first group. These characteristic parameters for the two different groups are a result of the different shapes of their PSWs.

Figure 10:
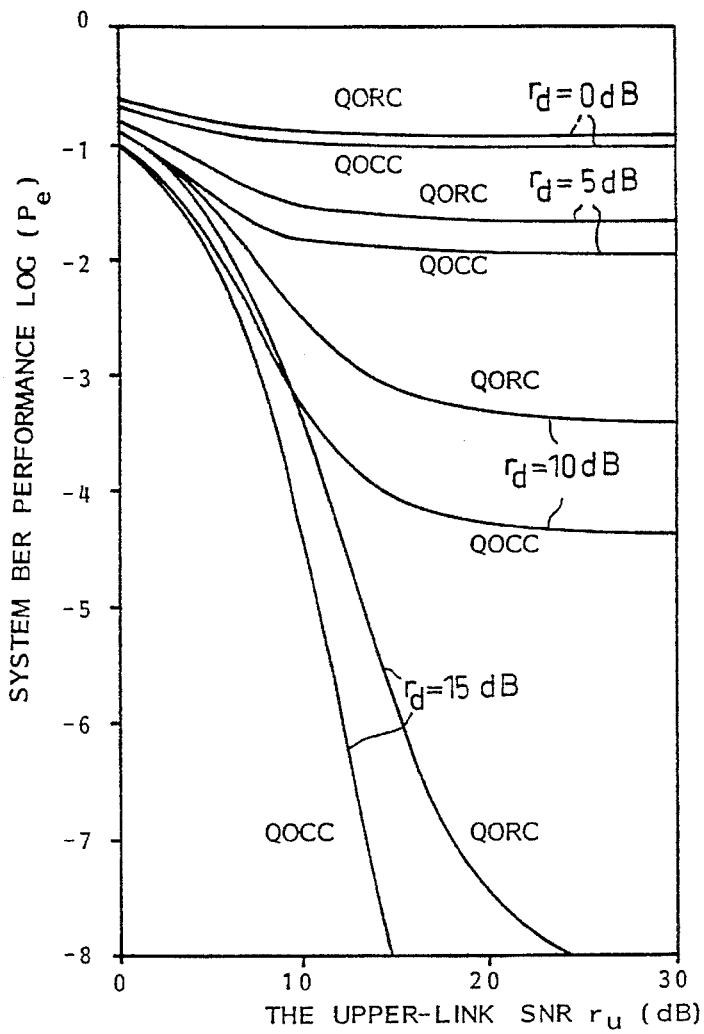
FIG. 10 shows BER versus $r_u$ and $r_d$ for QOCC and QORC modulations.

The BER (Bit Error Rate) performance for QOCC modulation under non-linear satellite channels is given in FIG. 10. In FIG. 10, $r_u$ and $r_d$ represent the upper-link and down-link SNRs in decibels. There are four distinct separate clusters of curves in the figure, indicating the four different down-link SNR values. As discussed earlier, the BER performance of QOCC modulation is much better than that of QORC modulation under any upper-link and down-link SNRs.

The new modulations can be divided into two groups according to their PSW characteristic parameters. The analysis shows that QOTC and MQOTC modulations are very suitable for applications where a relatively hostile environment exists to prevent accurate synchronization of timing, such as mobile communications in urban areas. The other group, QOCC and MQOCC modulations, is particularly suitable for non-linear communication channels, such as satellite communications and microwave relay systems using TWTA as transmitter power amplifiers in their repeaters.

Even though the present invention has been described with reference to particular embodiments thereof, it is not to be so limited, as changes and modifications may be made therein which are within the full intended scope of the invention as defined by the appended claims.

I claim:

1. Quadrature overlapping modulation method for modulating and shaping a baseband data sequence, said data sequence having the data bit rate of 1/T where T represents bit duration of the baseband data sequence in time, comprising separating said baseband data sequence into an even bit data sequence to an in-phase channel and an odd bit data sequence to a quadrature channel, delaying τ=T time said even bit data sequence and said odd bit sequence relative to each other, shaping both said even bit data sequence and said odd bit data sequence in a waveform shaping filter to generate a shaped even bit data sequence and a shaped odd bit data sequence, overlapping two consecutive data bits by 2T in time in both said odd data bit sequence and said even data bit sequence, wherein each data bit after waveform-shaping in both said odd and said even data sequences have a bit duration of 4T, generating in-phase and quadrature carrier signals, modulating both said shaped even bit data sequence and said shaped odd bit data sequence with said carrier signal to generate a modulated output signal, wherein, in said shaping step, said data sequences are shaped with a combination of a triangular function and a trigonometric function before carrier modulation.

2. Quadrature overlapping modulation method for modulating and shaping a baseband data sequence according to claim 1, in which method said shaping before carrier modulation is performed by a pulse shaping function g(t), where $$g(t) = \begin{cases} \dfrac{t}{2T} - \dfrac{1}{2\pi} \sin \dfrac{\pi t}{T} & (0 \leq t \leq 2T) \\ \left(2 - \dfrac{t}{2T}\right) + \dfrac{1}{2\pi} \sin \dfrac{\pi t}{T} & (2T \leq t \leq 4T) \end{cases} \quad \text{(Formula 1)}$$

3. Quadrature overlapping modulation method for modulating and shaping a baseband data sequence according to claim 1, in which method the triangular function and trigonometric function are single cycle functions.

4. Quadrature overlapping modulation method for modulating and shaping a baseband data sequence according to claim 1, in which method said data sequences are shaped with a second order version of said combination of a triangular function and a trigonometric function before carrier modulation.

5. Quadrature overlapping modulation method for modulating and shaping a baseband data sequence according to claim 4, in which method said shaping before carrier modulation is performed by a pulse shaping function g(t), where $$g(t) = \quad \text{(Formula 5)}$$

$$\begin{cases} \dfrac{t^2}{2T^2} - \dfrac{1}{2\pi^2} \sin^2\left(\dfrac{\pi t}{T}\right) & (0 \leq t \leq T) \\ \dfrac{2t}{T} - \dfrac{t^2}{2T^2} - 1 + \dfrac{1}{2\pi^2} \sin^2\left(\dfrac{\pi t}{T}\right) & (T \leq t \leq 3T) \\ -\dfrac{4t}{T} + \dfrac{t^2}{2T^2} + 8 - \dfrac{1}{2\pi^2} \sin^2\left(\dfrac{\pi t}{T}\right) & (3T \leq t \leq 4T) \end{cases}$$

6. Quadrature overlapping modulation method for modulating and shaping a baseband data sequence, said data sequence having a data bit rate of 1/T where T represents bit duration of the baseband data sequence in time, comprising separating said baseband data sequence into an even bit data sequence to an in-phase channel and an odd bit data sequence to a quadrature channel, delaying τ=T time said even bit data sequence and said odd bit data sequence relative to each other, shaping both said even bit data sequence and said odd bit data sequence in a waveform shaping filter to generate a shaped even bit data sequence and a shaded odd bit data sequence, overlapping two consecutive data bits by 2T in time in both said odd data bit sequence and said even data bit sequence, wherein each data bit after waveform-shaping in both said odd and said even data sequences have a bit duration of 4T, generating in phase and quadrature carrier signals, modulating both said shaped even bit data sequence and said shaped odd bit data sequence with said carrier signal to generate a modulated output signal, wherein, in said shaping step, said data sequences are shaped with a convolution function of two trigonometric functions.

7. Quadrature overlapping modulation method for modulating and shaping a baseband data sequence according to claim 6, in which method the trigonometric functions are substantially identical half cycle cosine functions.

8. Quadrature overlapping modulation method for modulating and shaping a baseband data sequence according to claim 6, in which method said shaping before carrier modulation is performed by a pulse shaping function g(t), where $$g(t) = \begin{cases} \dfrac{1}{\pi} \sin \dfrac{\pi t}{2T} - \dfrac{t}{2T} \cos \dfrac{\pi t}{2T} & (0 \leq t \leq 2T) \\ \left(\dfrac{t}{2T} - 2\right) \cos \dfrac{\pi t}{2T} - \dfrac{1}{\pi} \sin \dfrac{\pi t}{2T} & (2T \leq t \leq 4T) \end{cases} \quad \text{(Formula 6)}$$

9. Quadrature overlapping modulation method for modulating and shaping a baseband data sequence, said data sequence having a data bit rate of 1/T where T represents bit duration of the baseband data sequence in time comprising separating said baseband data sequence into an even bit data sequence to a first channel and an odd bit data sequence to a second channel, delaying τ=T time said even bit data sequence and said odd bit data sequence relative to each other shaping both said even bit data sequence and said odd bit data sequence in respective waveform shaping filters, generating in phase and quadrature carrier signals, modulating both said shaped even bit data sequence and said shaped odd bit data sequence with said in phase and quadrature carrier signals, respectively, to generate a modulated output signal, wherein, in said shaping step, said data sequences are shaped with a combination of one order linear function and trigonometric function.

10. Quadrature overlapping modulation method for modulating and shaping a baseband data sequence according to claim 9, in which method said shaping before carrier modulation is performed by a pulse shaping function g(t), where $$g(t) = \begin{cases} \dfrac{T\sin\dfrac{2\pi t}{T}}{15\pi^2} - \dfrac{65T\sin\dfrac{\pi t}{2t}}{15\pi^2} + \dfrac{2t}{\pi} & (0 \leq t \leq T) \\[2ex] -\dfrac{T\sin\dfrac{2\pi t}{T}}{15\pi^2} - \dfrac{128T\cos\dfrac{\pi t}{2T}}{15\pi^2} - \dfrac{64T\sin\dfrac{\pi t}{2T}}{15\pi^2} + \dfrac{2(2T-t)}{\pi} & (T \leq t \leq 2T) \\[2ex] \dfrac{T\sin\dfrac{2\pi t}{T}}{15\pi^2} - \dfrac{\sqrt{2}\,T\cos\left(\pi\left(-\dfrac{t}{2T}+\dfrac{1}{4}\right)\right)}{6\pi^2} - \dfrac{251T\cos\dfrac{\pi t}{2T}}{30\pi^2} + \dfrac{41T\sin\dfrac{\pi t}{2T}}{10\pi^2} - \dfrac{2(2T-t)}{\pi} & (2T \leq t \leq 3T) \\[2ex] -\dfrac{T\sin\dfrac{2\pi t}{T}}{15\pi^2} + \dfrac{64T\sin\dfrac{\pi t}{2T}}{15\pi^2} + \dfrac{2(4T-t)}{\pi} & (3T \leq t \leq 4T) \end{cases} \quad \text{(Formula 7)}$$

\* \* \* \* \*